United States Patent [19]

Alwerud

[11] Patent Number: 5,326,481
[45] Date of Patent: Jul. 5, 1994

[54] METHOD FOR AUTOMATIC DISPENSING OF HYDROCHLORINE IN SWIMMING POOL WATER

[76] Inventor: S. Tomas Alwerud, 8031 La Jolla Scenic Dr., La Jolla, Calif. 92037

[21] Appl. No.: 943,682

[22] Filed: Sep. 11, 1992

[51] Int. Cl.⁵ .............................................. C02F 1/76
[52] U.S. Cl. .................................. 210/742; 210/754; 364/571.03; 364/571.04; 364/496; 422/37
[58] Field of Search .............. 210/96.1, 169, 754, 210/739, 742, 138, 139, 143, 141, 142; 422/37, 108, 116; 364/496, 571.03, 571.04, 571.01, 571.02

[56] References Cited

U.S. PATENT DOCUMENTS

| | | | |
|---|---|---|---|
| 3,712,511 | 1/1973 | Magnasco | 210/169 |
| 3,763,878 | 10/1973 | Harden | 210/169 |
| 4,550,011 | 10/1985 | McCollum | 210/169 |
| 4,663,057 | 5/1987 | Powell, Jr. | 210/754 |
| 4,767,511 | 8/1988 | Aragon | 210/754 |

*Primary Examiner*—Neil McCarthy

[57] ABSTRACT

A method for automatic dispensing of chlorine in swimming pools where a computer measures the pool water temperature, and an empirically derived table is used for the computer to select a temperature related volume unit figure for chlorine dispensing, which volume unit figure is adjusted according to a first step calibration of the chlorine dispensing device and a second step calibration according to the water volume of the existing pool.

1 Claim, 1 Drawing Sheet

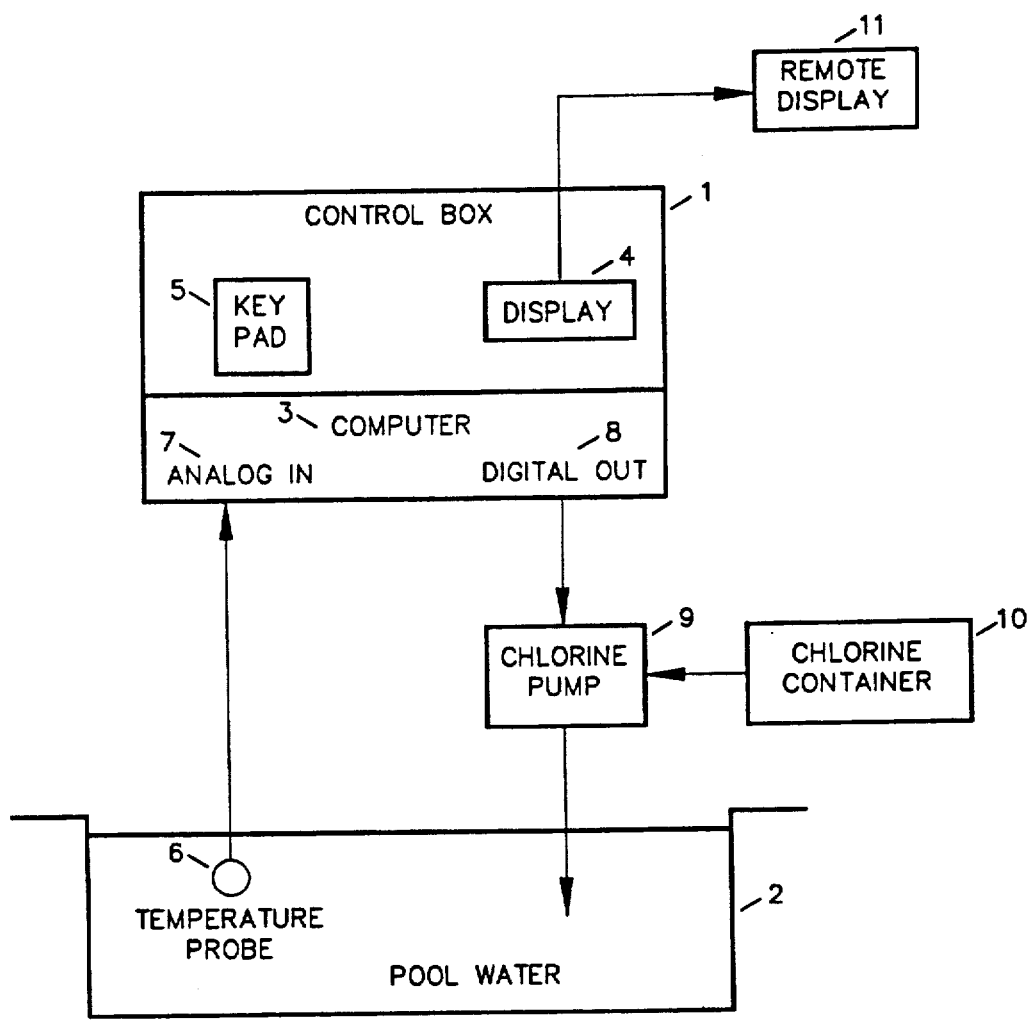

METHOD FOR AUTOMATIC DISPENSING OF HYDROCHLORINE IN SWIMMING POOL WATER

FIELD OF THE INVENTION

This invention relates to the field of dispensing chlorine into swimming pools and spas.

BACKGROUND ART

In swimming pools and spas, hydrochlorine (also called "liquid chlorine" or "chlorine") is a chemical necessary for disinfection of the water and to prevent the growth of algae. Dispensing is necessary to maintain the free form level of chlorine between 1.0 parts per million (ppm) to 1.5 ppm. At this level chlorine will effectively disinfect the pool water and prevent growth of algae. Also, the water at this chlorine level is considered safe for pool users. It is important that the chlorine level should not exceed 2.0 ppm as this might cause rash on the skin and/or irritation in eyes.

Usually, chlorine is dispensed into a pool daily. Correct amounts of chlorine are dispensed manually or by a chlorine dispensing device like a metering pump. The chlorine ppm level in the pool water is measured by a chlorine testing kit. If the chlorine level is too high, the dispensing of chlorine is decreased. If the chlorine level is to low, the dispensing of chlorine is increased. A chlorine dispensing device such as a metering pump runs on a manually set timer. Said chlorine dispensing device is activated each day when the pump is started for circulating the pool water. By manually setting the timer, the pump will dispense more or less chlorine.

Some systems dispense chlorine by using a chlorine sensor in the pool water. In such cases the metering pump will be started and stopped by the sensor's set point switches. However, a chlorine sensor is expensive and requires repeated calibration by a technician using a signal generator.

Many variables determine how much chlorine is needed. When water is cold (i.e. 5 to 10° C.) very little chlorine is required. With increasing temperature, biological activity increases. Increased sunlight adds to the biological activity and will break down the chlorine effect more rapidly. Heavy pool use increases the chlorine demand. Also, evaporation of chlorine is increased at higher water temperatures. Thus, a proper ppm level is maintained longer at lower water temperatures than at higher water temperatures. Consequently, at lower temperatures you can keep the chlorine ppm level in the lower range of the recommended level for a satisfactory result. At higher water temperatures the chlorine ppm level should be maintained within the higher recommended range in order to achieve a good result. Many factors determine the curve for adding chlorine. For instance, an approximate 35,000 gallon pool requires an addition of 0.14 gallons at 10° C., 0.2 gallons at 15° C., 0.3 gallons at 20° C., 0.44 gallons at 25° C., and 0.7 gallons at 30° C.

Currently, one must experiment with testing the chlorine ppm level and accordingly determine how much chlorine must be added. During this experimentation, it is easy to exceed the safe chlorine level and, possibly, to cause unhealthy conditions. High water temperatures in summer time will take less than twenty-four hours for the chlorine ppm level to return to zero. If the amount of chlorine is not added prudently and regularly, conditions are enhanced for algae growth. In such a case you incur additional cost for special chemicals to control algae. You have manual work for pool cleaning. The filter must be dismantled and cleaned plus the old filter powder must be replaced. Most of the time a pool will not be in operation during the algae-killing operation.

Most pool owners do not successfully manage the chlorine dispensing effectively. For this reason pool maintenance firms are employed for water disinfection and algae control.

SUMMARY OF THE INVENTION

With the foregoing in mind, it is a general objective of my invention to provide a method and the means for automatic dispensing of chlorine into swimming pools and spas. In my system, which employs automatic computer control, manual testing of the chlorine ppm level and the subsequent changes of the chlorine dispensing into the pool water is limited to a start up calibration procedure at the time the system is installed.

BRIEF DESCRIPTION OF DRAWING

FIG. 1 is a schematic diagram of the chlorination system for swimming pools according to this invention.

DESCRIPTION OF THE PREFERRED EMBODIMENT

An Octagon SBS 1100 computer 3 from Octagon Systems Corporation, 6510 W.91 Avenue, Westminster, CO 80030, has been used for the development of this invention. As shown in FIG. 1, the Octagon SBS 1100 3 in a control box 1 has Analog input 7, Digital Input/Output 8, Clock, Non Volatile Memory, Display 4 and Key pad 5. The pool water 2 temperature is measured by a temperature probe 6, submerged in the water. The temperature probe is connected to the computer's analog input 7. One digital output 8 is used as an on/off switch for the dispensing pump 9 with its chlorine container 10. The remote display 11 can be placed at a convenient location.

During all weather conditions over a period of three years, careful notes were kept of pool water temperature, of chlorine ppm levels, of quantities of chlorine added to the swimming pool, and algae conditions. The table shows the empirically derived units of volume of chlorine that must be added into the pool at different water temperatures in order to keep the chlorine ppm content within the recommended levels.

In the table, at approximately 35,000 gallons one unit of volume represents 0.1 gallon of chlorine. At 17,500 gallons one unit of volume represents half as much (0.05 gallon). At 25° C. a 35,000 gallon pool requires 0.44 gallon of chlorine and a 17,500 gallon pool requires 0.22 gallons. The differences in chlorine requirements at different temperatures illustrate the influence of varied factors such as use of the pool, biological activity, sunshine and weather. For example, at 20° C. the difference per degree C change is 0.2 units of volume. At 30° C. the difference is 0.6 units of volume.

The table unit values are converted by a two-step calibration procedure to fit any capacity of a dispensing device for any pool volume.

Step 1 Calibration, dosing pump:

The capacity of the dosing pump is stated in gallons per second. For example, the dispensing device is tested and run with water for 60 sec. If 1.2 gallons are dispensed during 60 seconds, the capacity is 0.02 gallon per second.

Step 2 Calibration, pool water volume:

Calibration establishes the time that the calibrated dosing pump must run in order to add the proper amount of chlorine into the pool at the current water temperature. The unit of volume of chlorine is 0.1 gallons if the pool volume is 35,000 gallons. Actual calibration is made by using a "Quota" number. If a "Quota" number of 1.0 is chosen for 35,000 gallons, a larger pool will have a higher than 1.0 "Quota" number and a smaller pool will have a smaller than 1.0 "Quota" number. For example:

1. Chlorine pump calibrated capacity: 0.02 Gallon/second.
2. Pool volume: Approximately 17,500 gallons.
3. Temperature of 22° C.

On basis of these values the computer will calculate as follows:

0.34 (=chlorine demand in a 35,000 gallon pool at 22° C.) divided by 0.02 (=dosing pump capacity gallons/second) times 0.5 (=quota figure for a 17,500 gallon pool) equals 8.5 seconds pump run time or 0.17 gallons of chlorine.

Step 2 Calibration is continued by fine tuning the system: Chlorine is dispensed. One hour after the addition of chlorine and with the pool pump still running, the chlorine ppm level is manually tested. As the exact volume of a pool is rarely known, you consult the "Quota" number for fine tuning the dispensing. If the ppm reading was 1.3 ppm, for example, change the "quota" from 0.50 to 0.58. Now the computer "thinks" the pool is larger and the pump will run 10 seconds the next day and discharge 0.20 gallons instead of 0.17. This will give you the right chlorine reading of 1.5 ppm. After a couple of tries to ascertain the "quota", the system is properly set up.

Calibration values are stored in the computer non volatile memory to protect in the event of a power failure.

It is possible to use data that do not exactly follow the numbers listed in the table. The curve described by units of chlorine used at different temperatures might be less or more steep and this could be compensated by more frequent ppm tests followed by new calibrations. In the event of data other than shown in the table, larger temperature changes could cause a dangerously high ppm level for pool users and too low ppm levels will enhance algae growth.

If the system is used with a dispensing device with known capacity, the first step of the calibration could be omitted. Capacity could be included in the computer's program.

In addition, by added programming the system's computer could handle three more timer functions which, together with three more digital outputs, could be used for activating the pool pump, a pool cleaning device and the pool lighting. Consequently, a prefabricated electric control box could be built which control box will reduce electric installation cost at a new swimming pool.

There are several advantages associated with this invention as compared to prior known ways of dispensing chlorine into swimming pool water. The best way to explain this is to describe how much work it takes to operate this invention in order to keep the pool water in good condition: After a simple calibration procedure, the only work is to keep the chlorine container filled.

There are important savings in chemical costs because unnecessary use of chlorine is avoided. As you will limit algae growth, there will be fewer interruptions in pool use to carry out algae-killing operations. Algae killing incurs extra costs for algae control chemicals, filter powder, plus labor. Water will be safer for pool users as excessively high chlorine levels can not be reached. Also, the opportunity to display the pool water temperature is easily possible in a remote and convenient location.

TABLE

The table represents the volume units of chlorine that has to be added to swimming pool water at different temperatures in order to maintain the chlorine ppm content within the recommended 1.5 to 1.0 level. In a pool with a water volume of 35,000 gallons one unit represents 0.1 gallons of chlorine.

| Degrees C | F | Units |
|---|---|---|
| 5 | 41 | 1.0 |
| 6 |  | 1.0 |
| 7 |  | 1.1 |
| 8 |  | 1.2 |
| 9 |  | 1.3 |
| 10 | 50 | 1.4 |
| 11 |  | 1.5 |
| 12 |  | 1.7 |
| 13 |  | 1.8 |
| 14 |  | 1.9 |
| 15 | 59 | 2.0 |
| 16 |  | 2.2 |
| 17 |  | 2.4 |
| 18 |  | 2.6 |
| 19 |  | 2.8 |
| 20 | 68 | 3.0 |
| 21 |  | 3.2 |
| 22 |  | 3.4 |
| 23 |  | 3.7 |
| 24 |  | 4.0 |
| 25 | 77 | 4.4 |
| 26 |  | 4.8 |
| 27 |  | 5.2 |
| 28 |  | 5.8 |
| 29 |  | 6.4 |
| 30 | 86 | 7.0 |

I claim:

1. A method for controlling the addition of chlorine to water in an existing swimming pool comprising:
   (a) calibrating a chlorine dispensing device to determine the volume of chlorine dispensed per unit of time;
   (b) measuring the temperature of the pool water;
   (c) determining, based on said measured temperature, a hypothetical amount of chlorine necessary to be dispensed into a hypothetical pool having a fixed volume to maintain the level of chlorine in the water of said hypothetical pool within the range of from about 1.0 to about 2.0 ppm at said measured temperature;
   (d) determining an actual amount of chlorine to be dispensed into said existing pool based on said hypothetical amount of chlorine determined in step (c) above by multiplying said hypothetical amount by a quota number which consists essentially of the ratio of the actual volume of the existing pool to the fixed volume of the hypothetical pool, thereby determining an actual amount of chlorine effective to maintain the chlorine level in the water of said existing pool at a desired level within the range of from about 1.0 to about 2.0 ppm;

(e) allowing the pump, based on said calibrated value of volume of chlorine dispensed per unit of time, to run for a length of time to dispense said actual amount of chlorine determined in step (d) above into the water of said existing pool;

(f) measuring the chlorine level of the water in said existing pool after dispensing said actual amount of chlorine and adjusting said quota number higher or lower in proportion to the ratio of the desired level of chlorine to the measured level of chlorine, and accordingly adjusting the dispensing time of the pump based on said ratio; wherein said hypothetical amount of chlorine based on temperature, said calibrated volume of chlorine dispensed per unit of time, and said quota number are store in computer memory and said temperature is automatically measured and inputted into said computer and wherein said computer determines the amount of time for which the calibrated pump is to be run to dispense a desired amount of chlorine.

* * * * *